Figure 1:
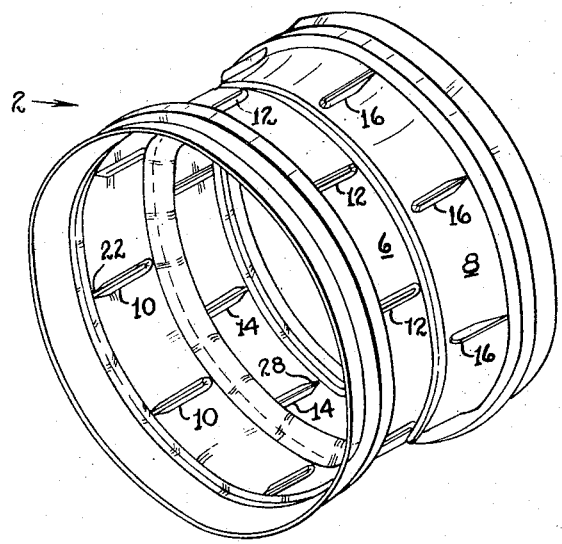

Feb. 13, 1968　　　D. W. FRENCH　　　3,368,830
PIPE JOINT
Original Filed Oct. 16, 1964

INVENTOR.
DAVID W. FRENCH
BY
*John A. McKinney*
ATTORNEY

United States Patent Office 3,368,830
Patented Feb. 13, 1968

3,368,830
PIPE JOINT
David W. French, Somerville, N.J., assignor to Johns-Manville Corporation, New York, N.Y., a corporation of New York
Continuation of application Ser. No. 404,445, Oct. 16, 1964. This application May 10, 1967, Ser. No. 637,888
3 Claims. (Cl. 285—110)

This application is a continuation of application Ser. No. 404,445, filed Oct. 16, 1964, and now abandoned.

The instant invention relates to a pipe joint and more particularly to a combination of coupling and gaskets to cooperate with adjacent ends of wide toleranced, rough barrel pipe to form a practical and efficient pipe joint. Although the combination of coupling and gaskets of the instant invention is particularly adapted for joining adjacent ends of unmachined asbestos-cement pipe, it may also be used where it is desired to have an efficient coupling for joining together adjacent ends of any type of wide toleranced, rough barrel pipe. More specifically, the combination of coupling and gasket is particularly suited for joining together adjacent ends of asbestos-cement pipe utilized for warm air ducts for perimeter heating or air conditioning.

The conditioning of air for heating or cooling is accomplished in modern basementless homes by a central unit which sends the heated or cooled air through a network of conduits. In many such installations, effective use is made of asbestos-cement pipe for providing these conduits since this type of pipe may be laid in and form a part of the concrete slab on which the home is built. In order for such pipe to be utilized, it must be economical and at the same time be readily assembled in a foolproof manner. The joints for such pipe must meet Federal Housing Specifications one of which is that it must be water tight from without under a five foot head of water. Also, the unmachined duct joint does not require field labor to machine short lengths of field cut duct to receive more close toleranced couplings. The conventional methods for producing asbestos-cement pipe are such that the ends of unmachined asbestos-cement pipe vary within a wide range of tolerances. Therefore, the coupling for joining together the ends of such unmachined pipe must be capable of providing the water tight joint, referred to above, over a wide range of tolerances.

It is an object of the instant invention to provide a coupling for providing a water tight seal between adjacent ends of wide toleranced, rough barrel pipe.

It is a further object of the instant invention to provide a coupling for joining adjacent ends of asbestos-cement pipe which may form a part of a concrete slab for a basementless home.

The foregoing objects are accomplished in accordance with the invention by a coupling comprising a plastic material having grooves therein for receiving gaskets and which coupling and gaskets cooperate with adjacent ends of asbestos-cement pipe to form a water tight joint between the adjacent ends of the asbestos-cement pipe such as wide toleranced, rough barrel, unmachined asbestos-cement pipe. In the preferred embodiment of the invention, the coupling comprises a generally cylindrical sleeve having flared ends and circumferential grooves adjacent each flared end. The coupling sleeve has an internal circumferential rib which divides the sleeves into substantially two separate sections. Each of these sections is provided with corrugations extending from the area adjacent the internal rib to the area adjacent each of the circumferential grooves. The corrugations extend generally in an axial direction and are spaced circumferentially one from another. Also, the corrugations in one section are offset circumferentially from the corrugations in the other section. The gaskets for use with these couplings comprise rubber rings having a cross-sectional configuration having a central, generally rectangular, radially extending portion from which extend a pair of integral axially extending arms. The radially outer portion of the gasket having the greatest outside diameter is adapted to be received in each of the grooves of the coupling sleeve with the axially extending arms being outside of the groove. The gasket further is provided with an integral, radially inner portion of smallest diameter which is adapted to be contacted and deformed by the pipe end. In operation, a gasket is placed in each groove and one pipe end is inserted into the coupling until it abuts against the internal rib. As the pipe end moves into the coupling it contacts and deforms the inner portion of the gasket in an axial direction. This deformation of the inner portion of the gasket causes a slight canting of the gasket in the groove so as to move the arms of the gasket into sealing engagement with the inner peripheral surface of the coupling and the outer peripheral surface of the pipe end. This deformation and canting of the gasket functions to produce a double seal guarding against exfiltration and infiltration of fluids relative to the pipe joint. The other pipe end is then inserted into the coupling and it cooperates with the gasket therein in the same manner as described above until it abuts against the other side of the internal rib. The flared end and flexible nature of the coupling together with the rubber ring gaskets cooperate to accommodate readily pipe ends of varying thicknesses, diameters and out of roundness. Also, the corrugations allow for the expension of the coupling sleeve to cooperate in the same manner in accommodating wide toleranced, rough barrel pipe. The internal rib functions to prevent any deformation of one section of the coupling sleeve to be carried into the other section of the coupling sleeve. Therefore, the combination of coupling sleeve, gaskets and adjacent pipe ends provided by the instant invention functions to produce a practical and efficient means for joining adjacent ends of wide toleranced, rough barrel pipe such as unmachined asbestos-cement pipe.

Figure 2:
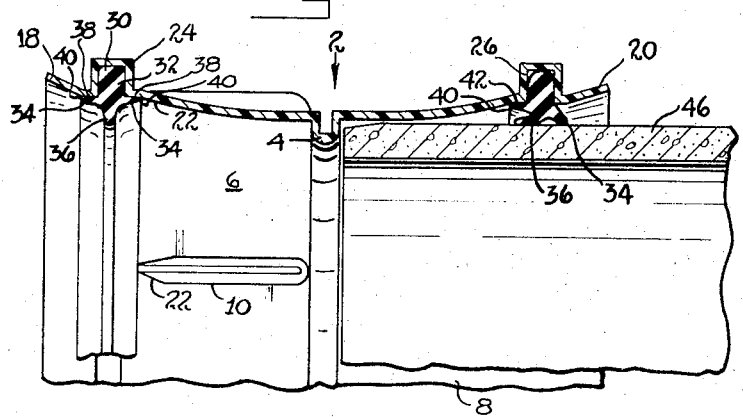

The invention will be more fully understood and further objects and advantages thereof will become apparent when reference is made to the following detailed description of a preferred embodiment of the invention and the accompanying drawings in which:

FIG. 1 is a pictorial representation of a coupling formed in accordance with the instant invention; and FIG. 2 is a view in cross-section of a portion of coupling of FIG. 1 and a portion of a completed joint.

Referring now to the drawings and in particular to FIGS. 1 and 2, there is illustrated a preferred form of the coupling made in accordance with the instant invention. As illustrated in FIG. 1, the coupling 2 is generally cylindrical in nature and comprises a semi-elastic material such as conventional polyethylene. An internal rib 4 divides the coupling 2 into two sections 6 and 8 of substantially equal dimensions. As described below, rib 4 also functions to provide automatic end separation and sleeve centering for the joint. The section 6 is provided with a plurality of corrugations 10 extending generally in an axial direction and spaced circumferentially thereof one from the other. The corrugations 10 extend generally radially outwardly and open radially inwardly so as to provide substantially a plurality of axially extending pockets opening radially inwardly. The external surface of the section 6 is continuous but has the radially extendings ribs 12 formed by the external surface of the corrugations 10. The section 8 is provided with a plurality of corrugations 14 and ribs 16 similar in all respects to the corrugations 10 and the ribs 12. As illustrated in FIG. 1, corrugations 14 and ribs 16 in the section 8 are misaligned in the axial direction from the corrugations 10 and the ribs 12 in the section 6. The end 18 of the section 6 and the end 20 of the section 8 are flared outwardly so as to have an inside diameter greater than the inside diameter in the remaining portions of the sections 6 and 8. The flared ends 18 and 20 are formed so that the minimum inside diameter thereof is slightly greater than the maximum allowable outside diameter of the pipe end to be accommodated. Also, the minimum inside diameter of the sections 6 and 8 is slightly less than the minimum outside diameter of the pipe end to the pipe end to be accommodated so as to insure in all cases a contiguous relationship between the pipe end and the coupling.

Between the flared end 18 and the end 22 of the corrugations 10, the section 6 is provided with a groove 24 which extends in an axial direction a distance less than it extends in a radial direction. A similar groove 26 is located between the flared end 20 of the section 8 and the end 28 of the corrugations 14. Set in each of the grooves 24 and 26 is a gasket 30 comprising a relatively resilient and deformable material such as rubber. The gasket 30 has a radially outer portion 32 of smallest outside diameter adapted to be received within the walls defining the groove 24 or 26. The outer portion 32 is complementary to the cavity defined by the walls of the groove 24 or 26 and extends in an axial direction a distance less than it extends in a radial direction. Integral with the radially outer portion 32 are a pair of generally axially extending arms 34 having sufficient radial thickness to provide stability to these arms. Each gasket 32 is further provided with an integral, radially inner portion 32 of smallest inside diameter. The maximum diameter of the inner peripheral surface of the portion 36 is smaller than the minimum outside diameter of any pipe to be used with a particular coupling. The inner peripehral surface 38 of the section 6 on either axial side of the groove 24 is complementary to the outer peripheral surface 40 of the arm 34 so that when the gasket 30 has been inserted into the groove, the surfaces 38 and 40 are substantially in contact throughout their circumferential extent. The inner peripheral surface 42 of the section 8 on either axial side of the groove 26 is complementary to the outer peripheral surface 40 of the arms 34 so that when the gasket 30 has been inserted into the groove 26, the surfaces 42 and 40 are substantially in contact throughout their circumferential extent.

The assembly of a joint using the coupling 2 of the instant invention is illustrated in the right hand side of FIG. 2. The unmachined pipe end 46 is inserted into the coupling 2 until the frictional forces between the pipe end and the coupling stop the further insertion of the pipe end into the coupling. In most instances, this occurs when the extremity of the pipe end reaches a position adjacent the end of corrugations 14 adjacent the rib 4. However, in some instances the pipe end may be inserted until the axial extremity of the pipe end 46 contacts one side of the rib 4. As the pipe end 46 moves into coupling 2, the pipe end 46 contacts the inner portion 36 of the gasket 30 and deforms the gasket in an axial direction toward the axial mid-point of the coupling 2 as illustrated in FIG. 2. This deformation of the gasket 30 causes the inner portion 36 to be urged against the outer peripheral surface of the pipe end 46. This deformation of the inner portion 36 causes a slight canting of the upper portion 32 in the groove 24 so as to move portions of the upper portion 32 of the gasket into a more intimate contact with the walls defining the groove. Also, the arm 34 nearer to the axial extremity of the coupling 2, is urged radially inwardly against the outer peripheral surface of the pipe end 46 and the other arm 34 of the gasket 30 and particularly the surface 40 thereof is urged more tightly against the surface 42 of the coupling 2. The close and intimate contact produced by the action of the pipe end 46 on the inner portion 36 so that the inner portion 36 contacts the outer peripheral surface of the pipe end 46 and the surface 40 of the arm being urged against the surface 42 of the coupling provides a good initial seal against passage of any fluid material out of the pipe. Also, the contact of the arm 34, nearer the axial extremity of the coupling 2, with the outer peripheral surface of the pipe end 46 cooperates with the canting of the outer portion 32 of the gasket 30 with the walls defining the groove 24 to provide an effective seal against the infiltration of fluid into the pipe line. As explained above, one of the features of the invention is that the gasket 30 and the groove 24 are complementary and have been designed so that the outer portion 32 of the gasket extends in a radial direction a distance greater than the distance it extends in an axial direction. This configuration is advantageous since it cooperates with the inner portion 36 of the gasket 30 and the arms 34 to prevent undue twisting or rolling of the gasket during the assembly of a pipe joint while also cooperating to provide a double seal against exfiltration and infiltration as described above. This configuration of the gasket 30 allows the whole gasket to rotate slightly in the groove under the forces generated by the deformation of the inner portion 36 of the pipe end 46 while the longer radial extent of the portion 32 retains the gasket 30 in the groove 24. This rotation of the gasket in the groove is limited by the contact of the outer portion 32 of the gasket 30 with the walls defining the groove and the forces produced by the contact of the arm 34, nearer the axial extremity of the coupling 2, with the outer peripheral surface of the pipe end 46. Therefore, the various elements comprising the coupling, the gasket, and the pipe end function to produce a new and unique joint for joining together ends of the adjacent wide toleranced, rough barrel pipe such as unmachined asbestos-cement pipe.

The following example is given for purposes of illustration only and it is not intended to limit the invention in any manner. A coupling 2 for use with a 6-inch air duct comprising asbestos-cement was provided so that each of the sections 6 and 8 would accommodate a pipe end having an outside diameter as large as 6.84 inches and yet providing an effective seal with a pipe having an outside diameter as small as 6.60 inches. The coupling 2 was formed from a semi-elastic conventional polyethylene having a specific gravity of 0.913 and having a wall thickness of about 0.07 inches with an inside diameter of about 6.72 inches which at the flared ends 18 and 20 is increased to about 7.12 inches. The coupling had an axial extent of about 4.50 inches and the rib 4 had an axial extent of about 0.75 inch. The gasket utilized with this coupling 2 had an outside diameter of about 7.62 inches and an inside diameter of about 6.46 inches. The peripheral surface of the arms 34 had an outside diameter of 7.22 inches while the ratio of radial extent to axial extent of the outer portion 32 of the gasket 30 was 1.33 to 1. It is noted that in the preferred embodiment of the invention, the outer portion 32 is formed so that it is snugly received in the groove 24 and in fact the outer surfaces of the portion 32 are substantially in contact with the walls defining either of the grooves 24 or 26.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. In a pipe joint comprising a male component, a female component, and a fluid sealing gasket wherein said female component has a circumferentially extending radially inwardly opening groove adjacent an axial extremity thereof and wherein said male component is inserted within said female component and said gasket is positioned between said male and female component to effect a fluid seal therebetween, the improvement comprising:
(a) a gasket comprising resilient material having a radially outer portion of greatest outside diameter closely fitted within said groove and held thereon against any substantial movement,
(b) said gasket having a plurality of integral axially extending arms,
(c) said gasket having at said axially extending arms a width in an axial direction greater than the width of said groove in said axial direction,
(d) said axially extending arms having an outside diameter substantially equal to the diameter of the inner peripheral surfaces of said coupling on either axial side of said groove,
(e) said gasket having a radially inner portion of smallest diameter having a width in an axial direction smaller than the width of said gasket in said axially extending arms,
(f) said pipe end when being inserted in said coupling contacting said radially inner portion and deforming said radially inner portion axially inwardly and radially outwardly so that said radially inner portion and the axially inner one of said axially extending arms exert compressive forces against said pipe end and said coupling, and
(g) the axially outer one of said axially extending arms being deformed into contact with said pipe end.

2. A pipe joint comprising:
(a) a coupling comprising a generally cylindrical sleeve comprising a semi-elastic material,
(b) an internal rib integral with said coupling for dividing said coupling into two generally cylindrical sections,
(c) a pair of pipe ends received within said coupling with each pipe end adjacent said internal rib,
(d) said coupling having a circumferentially extending radially inwardly opening groove adjacent each axial extremity thereof,
(e) a gasket comprising resilient material having a radially outer portion of greatest outside diameter closely fitted within each of said grooves and held therein against any substantial movement,
(f) said gasket having a plurality of integral axially extending arms,
(g) said gasket having at said axially extending arms a width in an axial direction greater than the width of said groove in said axial direction,
(h) said axially extending arms having an outside diameter substantially equal to the diameter of the inner peripheral surfaces of said coupling on either axial side of each of said grooves,
(i) said gasket having a radially inner portion of smallest diameter having a width in an axial direction smaller than the width of said gasket in said axially extending arms,
(j) each of said pipe ends when being inserted into said coupling contacting said radially inner portion and deforming said radially inner portion axially inwardly and radially outwardly so that said radially inner portion and the axially inner one of said axially extending arms exert compressive forces against said pipe end and said coupling, and
(k) the axially outer one of said axially extending arms being deformed into contact with said pipe end.

3. A pipe joint as defined in claim 2 wherein:
(a) said radially outer portion of said gasket extending in an axial direction a distance less than it extends in a radial direction, and
(b) said radially outer portion is canted in said groove.

References Cited

UNITED STATES PATENTS 3,064,983 11/1963 Halterman _____ 285—110 X
3,212,799 10/1965 Rice _____ 285—235

FOREIGN PATENTS 200,867 11/1958 Germany.
842,245 7/1960 Great Britain.

CARL W. TOMLIN, *Primary Examiner.*

D. AROLA, *Assistant Examiner.*